United States Patent [19]
Dietsche et al.

[11] Patent Number: 5,428,986
[45] Date of Patent: Jul. 4, 1995

[54] METHOD OF KNOCK RECOGNITION

[75] Inventors: Karl-Heinz Dietsche, Hirschlanden; Christian Rein, Ispringen, both of Germany

[73] Assignee: Robert Bosch GmbH, Stuttgart, Germany

[21] Appl. No.: 122,608

[22] PCT Filed: May 29, 1992

[86] PCT No.: PCT/DE92/00438
§ 371 Date: Sep. 30, 1993
§ 102(e) Date: Sep. 30, 1993

[87] PCT Pub. No.: WO92/21950
PCT Pub. Date: Dec. 10, 1992

[30] Foreign Application Priority Data

May 31, 1991 [DE] Germany .................. 41 17 807.6

[51] Int. Cl.⁶ .............................................. G01L 23/22
[52] U.S. Cl. ...................................................... 73/35
[58] Field of Search .................. 364/431.08; 73/35; 123/425, 435

[56] References Cited

U.S. PATENT DOCUMENTS

| | | | |
|---|---|---|---|
| 4,478,068 | 10/1984 | Bonitz | 73/35 |
| 4,699,106 | 10/1987 | Haraguchi | 73/35 |
| 4,750,103 | 6/1988 | Abo | 73/35 |

FOREIGN PATENT DOCUMENTS

| | | |
|---|---|---|
| 0098584 | 1/1984 | European Pat. Off. . |
| 0175915 | 4/1986 | European Pat. Off. . |
| 0421952 | 4/1991 | European Pat. Off. . |
| 0458993 | 12/1991 | European Pat. Off. . |
| 8911088 | 11/1989 | WIPO . |

Primary Examiner—Thomas P. Noland
Assistant Examiner—Christine K. Oda
Attorney, Agent, or Firm—Michael J. Striker

[57] ABSTRACT

A method of knock recognition includes the introduction of evaluation factors, specific to the application, and the multiplication of the measured reference levels by these evaluation factors. These evaluation factors ensure that excessively high knock integrals of a particular cylinder, which is heard better than the other cylinders because of the sensor installation location, are not erroneously recognized as knocking.

4 Claims, 1 Drawing Sheet

METHOD OF KNOCK RECOGNITION

BACKGROUND OF THE INVENTION

The present invention relates to a method of knock recognition. A method of this type is already known. In this known method of knock recognition, a common knock sensor on the engine block is associated with a four-cylinder engine of an internal combustion engine. This knock sensor records, for each cylinder, the noise level in the cylinder concerned over a certain crankshaft angle. The knock sensor signal recorded in this way is integrated over this crankshaft range. The signals which the knock sensor supplies are amplified for the individual cylinder. Because the different cylinders are heard with different loudness levels by the knock sensor, because of its installation location, different reference levels result for the cylinders. The amplification of the recorded reference level takes place with different factors on the basis of the different sound intensities. For an objective comparison of the individual reference levels RP, a standardized reference level RPn is determined in which the reference level RP is divided by the amplification factor of the individual cylinder. These standardized reference levels in this way form the basis for the knock recognition because measured knock integrals are analyzed which are referred to the reference level in normal operation, i.e. when the engine is running without knocking. In this known method, the average $\overline{RPn}$ of all the standardized reference levels RPn is first formed. The quotient of the average $\overline{RPn}$ of all the cylinders and of the standardized reference levels RPn of a cylinder determines the region in a knock recognition factor characteristic diagram from which a knock recognition factor (K factor) is to be taken. This K factor characteristic diagram is arranged in terms of the standardized reference level RPn and the rotational speed. The K factor (K) determined is multiplied by the reference level RP and, by this means, determines the knock threshold.

In this method, the selection of the K factor is erroneous because the sensor hears noises in a certain cylinder, which are actually normal, as being louder because of the installation location in the engine block. This means that the sensor emits a higher reference level for analysis in the case of a cylinder which can be heard easily. In consequence, the quotient of the standardized reference level of this cylinder and the average $\overline{RPn}$ is greater than that for the other cylinders. Because of this, the K factor is taken from a different region of the characteristic diagram so that the knock threshold for this cylinder is reduced. As a result, even a normal noise level can erroneously lead to knock recognition. In the reverse case, the knock threshold would be raised for a cylinder which is less easily heard because of an unfavourable sensor installation location and, in consequence, supplies smaller knock integrals. Actual knocking in this cylinder would not, under certain circumstances, be recognized.

In addition, a method of knock recognition is known from EP 0 098 584 in which the knock signals filtered by means of a band pass are compared with a reference value by a comparator. If the knock signals are larger than the reference value, a pulse is emitted by the comparator. These pulses are integrated and compared with a knock threshold fixed for the specific cylinder. This knock threshold fixed for the specific cylinder is a direct decision criterion. This method does not permit the sensor sensitivity to be taken into account because the parameters individual to the cylinder are not already taken into account before the comparison with the reference level.

SUMMARY OF THE INVENTION

Accordingly, it is an object of the present invention to provide a method of knock recognition, which avoids the disadvantages of the prior art.

In keeping with these objects and with others which will become apparent hereinafter, one feature of the present invention resides, briefly stated, in a method of knock recognition for internal combustion engines with a plurality of cylinders, the numbers of knock sensors being smaller than the number of cylinders and knock recognition factors (K factors) for determined the knock threshold in a cylinder being called up from a knock recognition factor characteristic diagram, which is arranged in terms of a standardized reference level and the rotational speed, in such a way that the quotient of the standardized reference level of a cylinder and the average of the standardized reference levels of all cylinders determines the region in the knock recognition factor characteristic diagram from which the knock recognition factor is taken as a function of the rotational speed, wherein in accordance with the present invention the standardized reference level (RP/V) of each cylinder is multiplied by an evaluation factor (f) before the selection of the knock recognition factor, the evaluation factor (f) providing compensation for the different reference levels which occur in normal operation and are caused by the sensor installation location.

When the method is performed in accordance with the present invention, it has, in contrast, the advantage that, because of the association of an evaluation factor with each cylinder for cylinders with different "loudness levels" which are caused by the sensor installation location, the knock recognition factor is taken from an average region for each cylinder when the engine is not knocking.

It is particularly advantageous that it is possible to use an accurately defined region in the K factor characteristic diagram for each cylinder by calculating the average reference level in normal operation, when the engine is not knocking.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
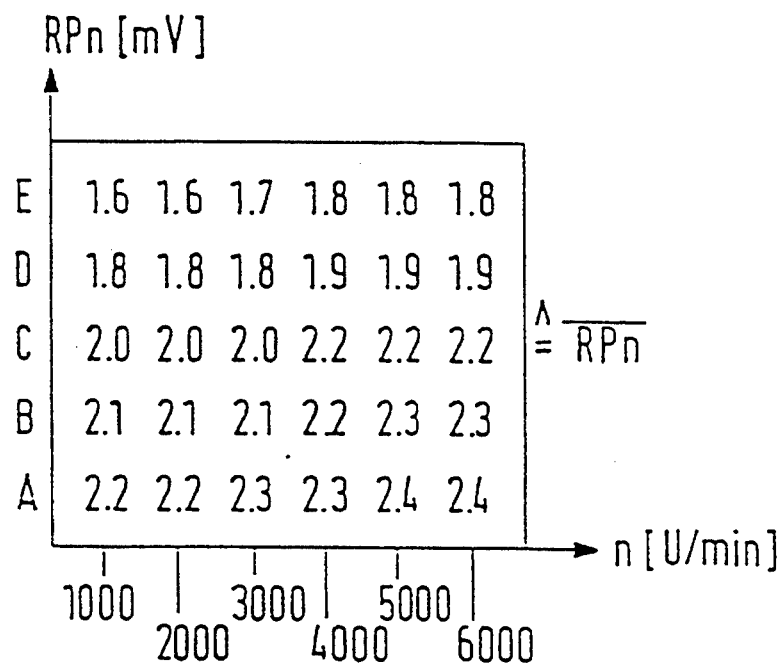
FIG. 1 shows a K factor characteristic diagram and
FIG. 2 shows a block circuit diagram for the selection of the knock recognition factor (K factor).

A knock recognition factor characteristic diagram is represented in FIG. 1 and examples of values for the K factors of an internal combustion engine are entered in it. This characteristic diagram is arranged in terms of the standardized reference level RPn and the rotational speed n. In the K factor characteristic diagram represented, the standardized reference level RPn (in mV) is subdivided into individual regions A, B, C, D and E, the average $\overline{RPn}$ of all the standardized reference levels being located in the region C. This means that in normal operation when the engine is not knocking, the region C is used for selecting the K factor and the K factor is now selected as a function of the rotational speed n. If the standardized reference level RPn of a cylinder deviates from the average $\overline{RPn}$, the K factor is taken from a different region depending on the nature of the deviation. This means that a cylinder which is heard "louder" makes use of another region (for example region D) with a small K factor so that the knock threshold (K.RP) is reduced and, under certain circumstances, knocking is recognized, although the causes of the larger standardized reference level lie in the arrangement of the sensor.

Figure 2:
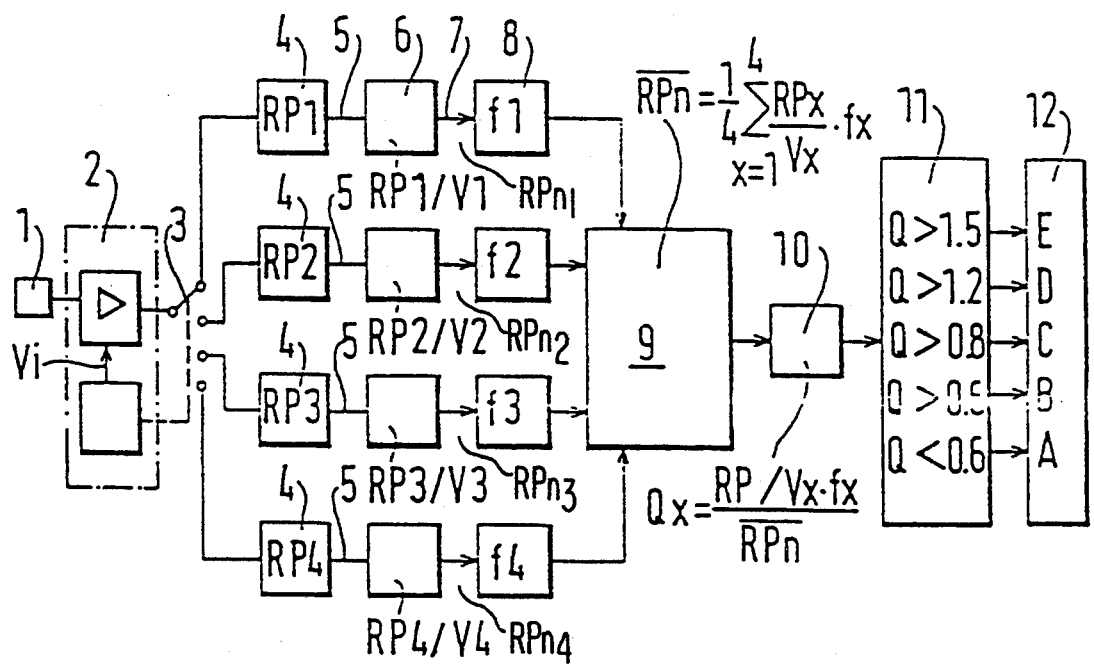

The essence of the invention is now explained with the aid of FIG. 2 and what has been stated above with respect to FIG. 1. The block circuit diagram for the selection of the K factor is represented in FIG. 2 using a 4-cylinder internal combustion engine as an example. A knock sensor 1 records the noises in the individual cylinders, which are subsequently amplified for an individual cylinder (Vi) in an amplifier circuit 2. The respectively recorded noise level of the knock sensor 1 is supplied to the corresponding analysis circuit for this cylinder by appropriately closing (for example by specifying with the ignition sequence) a switch 3. The reference levels RP1 to RP4 for the specific cylinders are formed from the measured knock signal integrals by means of low-pass filtering 4 and these reference levels are now present on the feed lines 5. In the subsequent operational step, a standardized reference level RPn is calculated in Stage 6 by dividing out the amplification factors V1 to V4 of the individual cylinders. This is necessary because the amplification for the individual cylinders can be different, as is illustrated by the different indices. As a result of this, the standardized reference levels RPn4 to RPn4 of the individual cylinders are present on the feed lines 7. In the following operational step, each standardized reference level is multiplied by an individual cylinder evaluation factor f1 to f4 in Stage 8. These evaluation factors f are already fixed in the application for each type of engine and they result from the fact that the reference levels formed by the knock integrals in Stage 4 can be of different magnitude, for the same noises, because of the sensor installation location. These evaluation factors f are fixed in such a way that, in the case of an engine which is not knocking, the K factor for each cylinder is taken from the region C of the K factor characteristic diagram. The further analysis now takes place in the manner already known from the prior art. This means that, in the following operational step of Stage 9, the average $\overline{RPn}$ is calculated for all the standardized reference levels RPn multiplied by the respective factor f. in the subsequent operational step of Stage 10, the quotient Q of the standardized reference level and the average of all the standardized reference levels is calculated for each cylinder. In the further operational step, one of the standard values A to E is respectively associated, in a Stage 11, with the quotient Q which has been determined, so that the corresponding region A to E to be used in the K factor characteristic diagram is fixed in accordance with the value Q which has been determined. Using this K factor taken from the characteristic diagram region, the knock threshold of a cylinder is finally calculated in Stage 12 and compared with the current reference level of the respective cylinder.

The analysis described is carried out during each combustion process so that each stage is worked out with the current value. Particularly in the case of the formation of the average $\overline{RPn}$, the measured values for the individual cylinders are deposited in a memory and used for the analysis until a new measurement is present for this cylinder.

The evaluation factors f are determined in the application for the various engine types. For this purpose, the engine is operated in the region where it does not knock and the reference levels of the different cylinders supplied by a knock sensor are analysed in such a way that an evaluation factor is associated with each cylinder, said evaluation factor ensuring that, in the case of operation without knocking, an average region of the knock factor characteristic diagram is used for all cylinders. These evaluation factors determined in this way are stored and, as a rule, remain for the life of the engine. It is, however, also possible to fix different evaluation factors for each cylinder, referred for example to different load ranges.

Thus, the evaluation factors F are fixed for each of cylinders as a function of different operational conditions of the internal combustion engine.

It will be understood that each of the elements described above, or two or more together, may also find a useful application in other types of methods differing from the types described above.

While the invention has been illustrated and described as embodied in a method of knock recognition for internal combustion engines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A method of knock recognition for internal combustion engines with a plurality of cylinders, comprising the steps of providing a number of knock sensors smaller than a number of the cylinders so that at least one of the cylinders is associated with each of the knock sensors; determining for each of the cylinders a reference level by one of the knock sensors associated with each of the cylinders and said one of said knock sensors connected with an amplifier with an amplification factor; forming a standardized reference level for each one of said cylinders by dividing the reference level for each of the cylinders by the amplification factor which is individual to each of the cylinders; multiplying the standardized reference level of each of said cylinders by an evaluating factor which provides a compensation for different reference levels occurring in a normal operation and caused by an installation location of each of said sensors; calculating an average value of the standardized reference levels of all the cylinders multiplied by the evaluation factors; determining a quotient of the standardized reference level of each of the cylinders to the average value of the standardized reference level of all the cylinders; determining from the quotient a region in a knock recognition factor characteristic diagram which covers the standardized reference level for each of the cylinders and a rotational speed from which a knock recognition factor is taken as a function of the rotational speed for determination of a knock threshold.

2. A method as defined in claim 1, wherein the evaluation factor is determined as a function of the installation location for each of the cylinders of the internal combustion engine.

3. A method as defined in claim 1, wherein the evaluation factor for each of the cylinders is determined as a function of the operational condition of the internal combustion engine.

4. A method as defined in claim 1, wherein in a normal operation determining the knock recognition factor for each of the cylinders is taken in the region of the knock recognition factor characteristic diagram which is associated with the normal operation of the internal combustion engine.

* * * * *